US011869703B2

(12) United States Patent
Sugie et al.

(10) Patent No.: US 11,869,703 B2
(45) Date of Patent: Jan. 9, 2024

(54) WOUND-WIRE-TYPE INDUCTOR COMPONENT

(71) Applicant: Murata Manufacturing Co., Ltd., Kyoto-fu (JP)

(72) Inventors: Hiroyuki Sugie, Nagaokakyo (JP); Tomotaka Gotoda, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 733 days.

(21) Appl. No.: 16/776,451

(22) Filed: Jan. 29, 2020

(65) Prior Publication Data

US 2020/0265988 A1 Aug. 20, 2020

(30) Foreign Application Priority Data

Feb. 15, 2019 (JP) ................................ 2019-025630

(51) Int. Cl.
*H01F 27/28* (2006.01)
*H01F 27/29* (2006.01)
*H01F 17/04* (2006.01)

(52) U.S. Cl.
CPC ......... *H01F 27/2823* (2013.01); *H01F 17/04* (2013.01); *H01F 27/29* (2013.01); *Y10T 29/5313* (2015.01)

(58) Field of Classification Search
CPC ........ H01F 17/045; H01F 27/28; H01F 41/06; H01F 41/10; H01F 17/04; H01F 27/24; H01F 27/2828; H01F 27/2823; Y10T 29/5313
USPC .... 29/729, 602.1, 603.01, 603.23, 604, 740, 29/741, 747, 787
See application file for complete search history.

(56) References Cited

U.S. PATENT DOCUMENTS 10,878,993 B2 * 12/2020 Tanaka ................ H01F 27/2823
2003/0030526 A1 2/2003 Hirai et al.

FOREIGN PATENT DOCUMENTS

CN 1405803 A 3/2003
JP H08-124749 A 5/1996
(Continued)

OTHER PUBLICATIONS

An Office Action; "Notice of Reasons for Refusal," mailed by the Japanese Patent Office dated Oct. 19, 2021, which corresponds to Japanese Patent Application No. 2019-025630 and is related to U.S. Appl. No. 16/776,451 with English translation.

*Primary Examiner* — Thiem D Phan
(74) *Attorney, Agent, or Firm* — Studebaker & Brackett PC

(57) ABSTRACT

A wound-wire-type inductor component includes a core including a column-shaped shaft part that extends in a first direction, and a first support part and a second support part that are respectively provided at a first end portion and a second end portion of the shaft part; a first terminal electrode and a second terminal electrode that are respectively provided on the first support part and the second support part; and a wire including a wound wire part that is wound around the shaft part and a first end and a second end that are respectively connected to the first terminal electrode and the second terminal electrode. The interval between adjacent turns of the wound wire part in the first direction is set so that the number of turns wound around the shaft part is high with respect to a prescribed inductance value.

20 Claims, 4 Drawing Sheets

(56) References Cited

FOREIGN PATENT DOCUMENTS

| | | | |
|---|---|---|---|
| JP | 2008-091359 | A | 4/2008 |
| JP | 2017-163099 | A | 9/2017 |

* cited by examiner

WOUND-WIRE-TYPE INDUCTOR COMPONENT

CROSS-REFERENCE TO RELATED APPLICATION

This application claims benefit of priority to Japanese Patent Application No. 2019-025630, filed Feb. 15, 2019, the entire content of which is incorporated herein by reference.

BACKGROUND

Technical Field

The present disclosure relates to a wound-wire-type inductor component that includes a wire that is wound around a core.

Background Art

In the related art, a wound-wire-type inductor component is mounted in various electronic devices. A wound-wire-type inductor component includes a core and a wire that is wound around the core as described, for example, in Japanese Unexamined Patent Application Publication No. 2017-163099.

The above-described wound-wire-type inductor component may be used in an application in which an electrical signal generated in the wound-wire-type inductor component in response to magnetic flux incident on the wound-wire-type inductor component from the outside is output, as in the case of an antenna coil of a wireless communication circuit. Furthermore, in a wound-wire-type inductor component used as an antenna coil, a prescribed inductance value may be set so as to tune the resonant frequency of a parallel resonant circuit to a prescribed carrier frequency.

SUMMARY

Accordingly, the present disclosure provides a wound-wire-type inductor component that is suitable for use as an antenna coil having a prescribed inductance value.

A wound-wire-type inductor component, which is an aspect of the present disclosure, includes a core including a substantially column-shaped shaft part that extends in a first direction and a first support part and a second support part that are respectively provided at a first end portion and a second end portion of the shaft part in the first direction of the shaft part; a first terminal electrode and a second terminal electrode that are respectively provided on the first support part and the second support part; and a wire including a wound wire part that is wound around the shaft part and a first end and a second end that are respectively connected to the first terminal electrode and the second terminal electrode. The interval between adjacent turns of the wound wire part in the first direction is set so that the number of turns wound around the shaft part is high with respect to a prescribed inductance value.

According to this configuration, a wound-wire-type inductor component can be provided that is suitable for use as an antenna coil having a prescribed inductance value.

According to the aspect of the present disclosure, there can be provided a wound-wire-type inductor component that is suitable for use as an antenna coil having a prescribed inductance value.

Other features, elements, characteristics and advantages of the present disclosure will become more apparent from the following detailed description of preferred embodiments of the present disclosure with reference to the attached drawings.

DETAILED DESCRIPTION

Hereafter, an embodiment of a wound-wire-type inductor component, which is an aspect of the present disclosure, will be described. In the accompanying drawings, constituent elements may be illustrated in an enlarged manner for ease of understanding. Dimensional ratios of the constituent elements may differ from the actual ratios or may differ from the ratios in other drawings.

Figure 1:
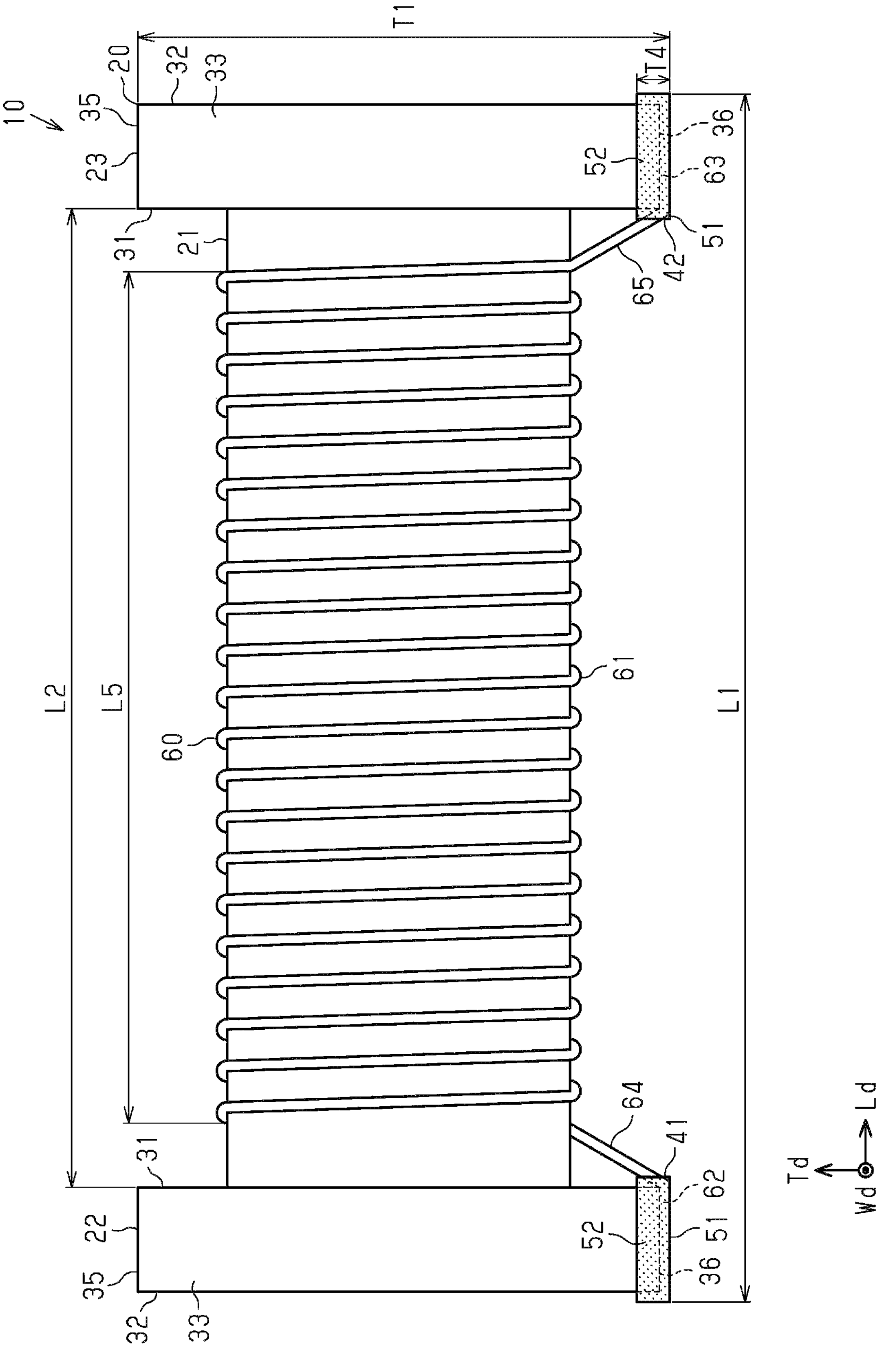
FIG. 1 is a schematic front view of a wound-wire-type inductor component of an embodiment.
Figure 2:
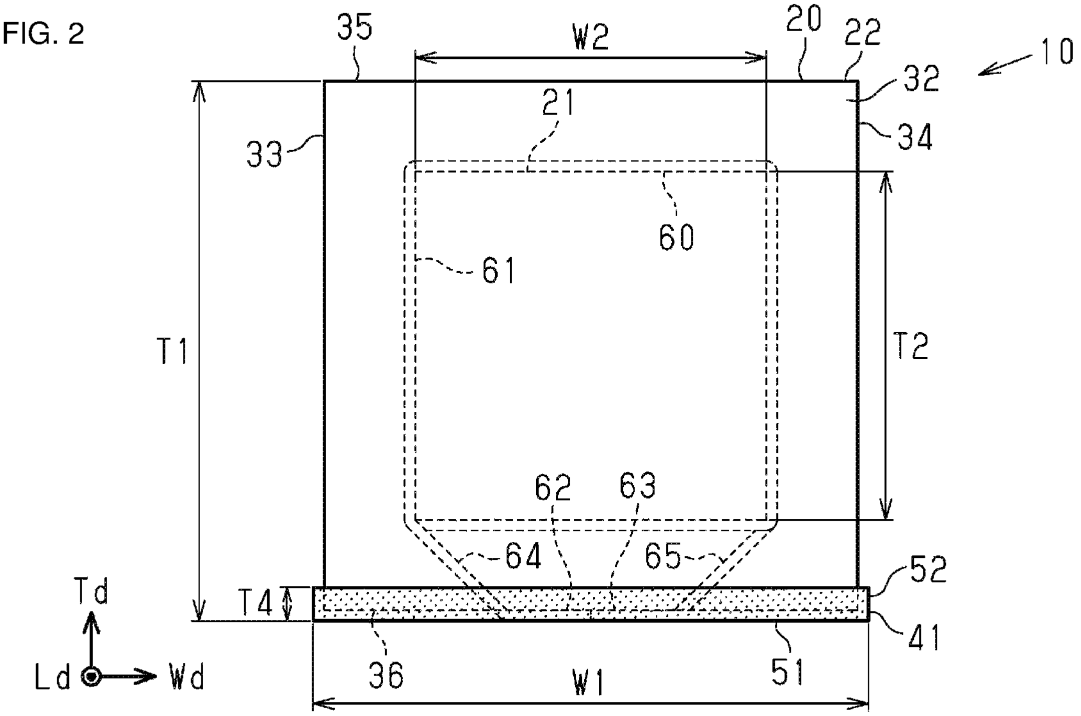
FIG. 2 is a schematic end view of the wound-wire-type inductor component of the embodiment.
Figure 3:
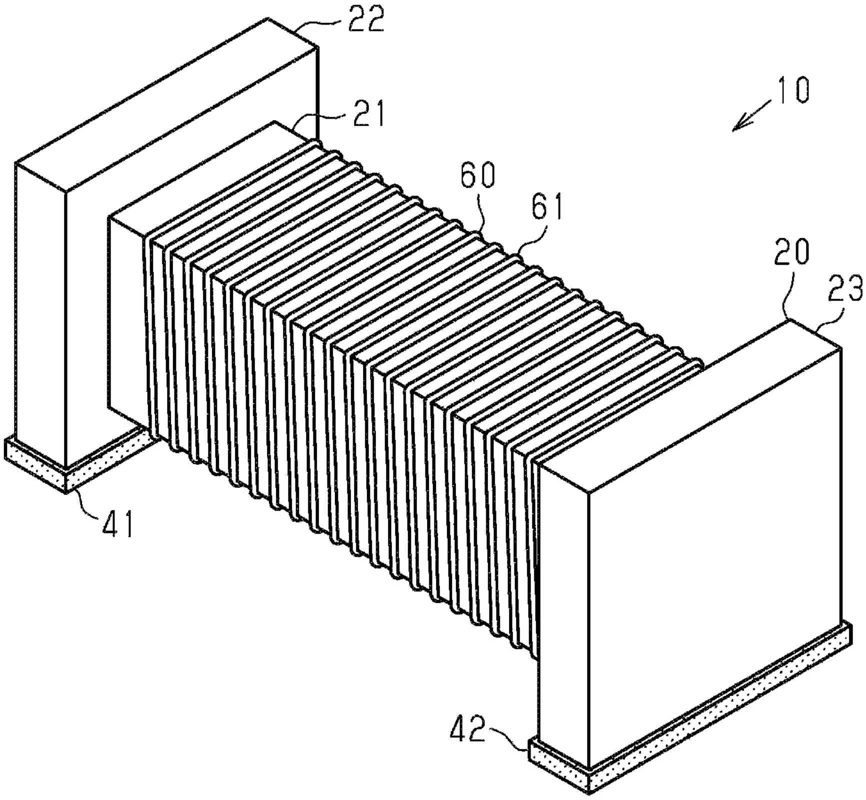
FIG. 3 is a schematic perspective view of the wound-wire-type inductor component of the embodiment.
Figure 4:
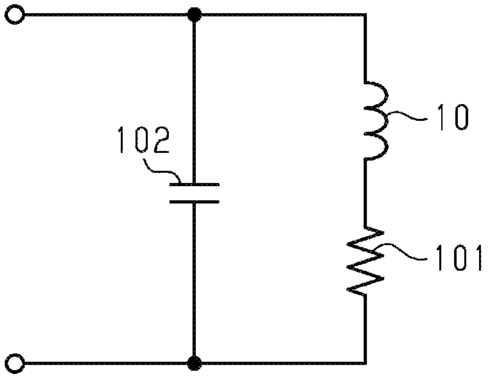
FIG. 4 is a circuit diagram of a parallel resonant circuit representing one usage example.

A wound-wire-type inductor component 10 illustrated in FIGS. 1 to 3 is a surface-mount wound-wire-type inductor component that is mounted on a circuit substrate or the like. The circuit substrate is for example a substrate on which a near-field-communication communication circuit is mounted. The wound-wire-type inductor component 10 is used as a transmission/reception antenna for near-field communication. For example, as illustrated in FIG. 4, a parallel resonant circuit used in a near-field communication device includes the wound-wire-type inductor component 10, a resistor 101, and a capacitor 102. The wound-wire-type inductor component 10 is connected in series with the resistor 101 and the capacitor 102 is connected in parallel with the series circuit consisting of the wound-wire-type inductor component 10 and the resistor 101.

The wound-wire-type inductor component 10 of this embodiment includes a core 20, a first terminal electrode 41 and a second terminal electrode 42, and a wire 60. The core 20 includes a substantially column-shaped shaft part 21 that extends in a first direction Ld and a first support part 22 and a second support part 23 that are respectively provided at a first end portion and a second end portion of the shaft part 21 in the first direction Ld. The shaft part 21 has, for example, a substantially rectangular columnar shape, but may instead have another polygonal columnar shape, a cylindrical shape, or a conical shape. The first support part 22 and the second support part 23 each have a substantially plate-like shape in which the main surfaces thereof have a substantially quadrangular shape and extend from the first end and the second end of the shaft part 21 in a second direction Td and a third direction Wd that are perpendicular to the first direction Ld. The first support part 22 and the second support part 23 support the shaft part 21 parallel to a mounting target (circuit substrate). The first support part 22 and the second support part 23 are integrated with the shaft part 21.

The first terminal electrode 41 is provided on a bottom surface 36 of the first support part 22 and the second terminal electrode 42 is provided on a bottom surface 36 of the second support part 23. The bottom surface 36 of the first support part 22 and the bottom surface 36 of the second support part 23 are surfaces that are located on one side (bottom side of paper in FIG. 2) in the second direction Td.

The wire 60 includes a wound wire part 61 that is wound around the shaft part 21 with the first direction Ld serving as the winding axis. The wound wire part 61 is directly wound around the shaft part 21 so as to form a single layer on the shaft part 21. The wire 60 has a first end 62 and a second end 63 that are respectively connected to the first terminal electrode 41 and the second terminal electrode 42. As will be described later, the interval between adjacent turns of the wound wire part 61 of the wound-wire-type inductor component 10 of this embodiment in the first direction Ld is set so that the number of turns wound around the shaft part 21 is as high as possible with respect to a prescribed inductance value.

The shaft part 21, the first support part 22, the second support part 23 may have a shape in which corner portions and edge portions are chamfered or a shape in which the corner portions or edge portions are rounded. Furthermore, irregularities and the like may be formed on part of or the entirety of each of the main surfaces, the end surfaces, and the side surfaces of the shaft part 21 and the first support part 22 and the second support part 23. In addition, the opposite surfaces of the shaft part 21, the first support part 22, and the second support part 23 do not necessarily have to be completely parallel to each other and may instead be somewhat inclined with respect to each other.

In the present specification, when the wound-wire-type inductor component 10 is mounted on a circuit substrate, the second direction Td is a direction that is perpendicular to the circuit substrate among directions perpendicular to the first direction Ld and the third direction Wd is a direction that is parallel to the circuit substrate among the directions perpendicular to the first direction Ld. Therefore, the second direction Td is a direction that is perpendicular to the bottom surfaces 36 of the first support part 22 and the second support part 23 on which the first terminal electrode 41 and the second terminal electrode 42 are formed, and the third direction Wd is a direction that is parallel to the bottom surfaces 36.

It is preferable that the size of the wound-wire-type inductor component 10 in the first direction Ld (length dimension L1) be in a range of around 4 mm to 7 mm. The length dimension L1 of the wound-wire-type inductor component 10 of this embodiment is around 5.5 mm, for example. In addition, it is preferable that the size of the wound-wire-type inductor component 10 in the third direction Wd (width dimension W1) be in a range of around 2 mm to 3.2 mm. The width dimension W1 of the wound-wire-type inductor component 10 of this embodiment is around 2.5 mm, for example. In addition, it is preferable that the size of the wound-wire-type inductor component 10 in the second direction Td (height dimension T1) be in a range of around 2 mm to 3.2 mm. The height dimension T1 of the wound-wire-type inductor component 10 of this embodiment is around 2.5 mm, for example.

The size of the shaft part 21 in the first direction Ld (length dimension L2) is preferably in a range of around 3 mm to 6 mm. The length dimension L2 of the shaft part 21 of this embodiment is around 5 mm, for example. Furthermore, the size of the shaft part 21 in the third direction Wd (width dimension W2) is preferably in a range of around 1.5 mm to 2.7 mm. The width dimension W2 of the shaft part 21 of this embodiment is around 2 mm. In addition, the size of the shaft part 21 in the second direction Td (height dimension T2) is preferably in a range of around 1.5 mm to 2.7 mm. The height dimension T2 of the shaft part 21 of this embodiment is around 2 mm.

In addition to the bottom surfaces 36 on which the first terminal electrode 41 and the second terminal electrode 42 are formed as described above, the first support part 22 and the second support part 23 each have an inner surface 31 that faces toward the shaft part 21, an end surface 32 that faces in an opposite direction from the inner surface 31, a pair of side surfaces 33 and 34 that are perpendicular to the inner surfaces 31 and the bottom surfaces 36, and an upper surface 35 that faces in the opposite direction from the bottom surface 36. The inner surface 31 of the first support part 22 faces the inner surface 31 of the second support part 23.

The core 20 is for example a molded body composed of a sintered body consisting of a nickel (Ni)-zinc (Zn)-based ferrite, a manganese (Mn)—Zn-based ferrite, alumina, or the like, a resin, a metal-magnetic-powder-containing resin, or the like.

The first terminal electrode 41 and the second terminal electrode 42 are formed of a base layer formed by applying and then baking a glass paste containing silver (Ag) and a plating layer composed of copper (Cu), Ni, tin (Sn) or the like formed on the surface of the base layer. The first terminal electrode 41 and the second terminal electrode 42 include not only bottom surface part electrodes 51 that cover the bottom surfaces 36 but also side surface part electrodes 52 in which parts of the first terminal electrode 41 and the second terminal electrode 42 wrap around onto the inner surfaces 31, the end surfaces 32, and the side surfaces 33 and 34. The bottom surface part electrodes 51 cover the entire bottom surface 36 of the first support part 22 and the entire bottom surface 36 of the second support part 23. The side surface part electrodes 52 cover parts (lower parts) of the inner surfaces 31, the end surfaces 32, and the side surfaces 33 and 34 of the first support part 22 and the second support part 23.

The wire 60, for example, includes a core wire having a substantially circular cross section and a covering material that covers the surface of the core wire. For example, a conductive material such as Cu or Ag can be used as the main constituent of the material of the core wire. An insulating resin material such as polyurethane, polyester, or polyamide-imide can be used as the material constituting the covering material. In this embodiment, the diameter of the core wire of the wire 60 is around 60 μm. The thickness of the covering material is around 4 μm, for example.

As illustrated in FIG. 1, the wire 60 includes the wound wire part 61 that is wound around the shaft part 21, the first end 62 and the second end 63 that are respectively connected to the first terminal electrode 41 and the second terminal electrode 42, and spanning parts 64 and 65 that span between the first end 62 and the second end 63 and the wound wire part 61. The first end 62 and the second end 63 are thermal pressure bonded to the bottom surface part electrodes 51 of the first terminal electrode 41 and the second terminal electrode 42 and thus the core wire is connected to the first terminal electrode 41 and the second terminal electrode 42.

(Operation)

Next, operation of the above-described wound-wire-type inductor component 10 will be described. The wound-wire-type inductor component 10 includes: the core 20 including the substantially column-shaped shaft part 21 that extends in the first direction Ld and the first support part 22 and the second support part 23 that are respectively provided at the first end portion and the second end portion of the shaft part 21 in the first direction Ld; the first terminal electrode 41 and the second terminal electrode 42 that are respectively provided on the first support part 22 and the second support part 23; and the wire 60 including the wound wire part 61 that is wound around the shaft part 21 and the first end 62 and the second end 63 that are respectively connected to the first terminal electrode 41 and the second terminal electrode 42. The interval between adjacent turns of the wound wire part 61 in the first direction Ld is set so that the number of turns wound around the shaft part 21 is high with respect to a prescribed inductance value.

Here, description will be given of an induced voltage generated by magnetic flux incident from the outside in a case where the wound-wire-type inductor component 10 is used as an antenna coil. The induced voltage is an indicator for measuring the performance of an antenna coil and is preferably as high as possible.

An induced voltage V induced generated in the wound-wire-type inductor component 10 which is used as an antenna coil placed in a constant magnetic field H ($H=B/\mu_0$) can be expressed by the following formula using Faraday's law of electromagnetic induction ($V=-N(\Delta\Phi/\Delta t)$:

$$V\text{induced}=N\times\mu_{rod}\times A_{rod}\times 2\times\pi\times fc\times\mu_0\times H$$

In the above formula, $\mu_0$: permeability of vacuum, μrod: relative permeability, Arod: cross-sectional area of shaft part, N: number of turns, fc: carrier frequency.

From the above formula, it is clear that an induced voltage V induced is obtained that becomes larger as the number of turns N increases under conditions where the magnetic field H, the relative permeability μrod, the shaft part cross-sectional area Arod, the carrier frequency fc, and so forth are constant. However, as described above, in an antenna coil having a prescribed inductance value, the number of turns N cannot be freely set due to the mutual relationship between the number of turns N and the inductance value.

In the wound-wire-type inductor component 10 of this embodiment, the interval between adjacent turns of the wound wire part 61 in the first direction Ld is set so that the number of turns wound around the shaft part 21 is high with respect to a prescribed inductance value. In other words, when the interval between adjacent turns of the wound wire part 61 is increased, the inductance value that can be obtained per one turn falls due to the reduction in magnetic coupling between turns that arises from magnetic flux leaking from between the turns and due to the increase in magnetic resistance caused by the increase in the average magnetic path length along which magnetic flux generated by the wound wire part 61 circulates. Thus, the number of turns of the wound wire part 61 can be increased with respect to a prescribed inductance value and a higher induced voltage V induced can be obtained. Thus, the wound-wire-type inductor component 10 is suitable for use as an antenna coil having a prescribed inductance value.

In the wound-wire-type inductor component 10, it is preferable that the number of turns be in a range of around 18 to 30 and that the wound-wire-type inductor component 10 have an inductance value of around 3.7 μH±10% with respect to an input signal having a frequency of around 10 MHz. It is further preferable that the number of turns be in a range from 20 to 23 and that the wound-wire-type inductor component 10 have an inductance value of around 3.7 μH±5% with respect to an input signal having a frequency of around 10 MHz. In this embodiment, the number of turns is 21 and the inductance value is around 3.7 μH±5% with respect to an input signal having a frequency of around 10 MHz. When the number of turns is large, a higher induced voltage V induced can be obtained. However, as the number of turns increases, it is necessary to make the interval between adjacent turns larger in order to realize the prescribed inductance value. Therefore, an increase in the size of the wound-wire-type inductor component 10 and a decrease in the Q value of the wound-wire-type inductor component 10 can be suppressed by setting an appropriate upper limit for the number of turns.

The wound-wire-type inductor component 10 preferably has a Q value in a range of around 26.5 to 100 with respect to an input signal having a frequency of around 10 MHz and more preferably has a Q value in a range of around 35 to 60 with respect to an input signal having a frequency of around 10 MHz. The higher the Q value, the greater the degree to which loss can be reduced. On the other hand, it is possible to secure the band of a signal obtained by resonance by setting an appropriate upper limit for the Q value.

The shaft part 21 of the wound-wire-type inductor component 10 preferably has a length dimension L2 in a range of around 3 mm to 6 mm, a width dimension W2 in a range of around 1.5 mm to 2.7 mm, and a height dimension T2 in a range of around 1.5 mm to 2.7 mm. In this embodiment, the shaft part 21 has a length dimension L2 of around 5 mm, a width dimension W2 of around 2 mm, and a height dimension T2 of around 2 mm. The larger the length dimension L2 of the shaft part 21 is, the more room there is to increase the number of turns. Furthermore, the larger the width dimension W2 and the height dimension T2 of the shaft part 21 are, the more the cross-sectional area of the shaft part 21 can be increased. Thus, a higher induced voltage V induced can be obtained. On the other hand, an increase in the size of the wound-wire-type inductor component 10 can be suppressed by setting appropriate upper limits for the length dimension L2, the width dimension W2, and the height dimension T2 of the shaft part 21.

The core 20 of the wound-wire-type inductor component 10 preferably has outer dimensions consisting of a length dimension L1 in a range of around 4 mm to 7 mm, a width dimension W1 in a range of around 2.0 mm to 3.2 mm, and a height dimension T1 in a range of around 2.0 mm to 3.2 mm. The core 20 further preferably has a length dimension L1 of around 5.5 mm, a width dimension W1 of around 2.5 mm, and a height dimension T1 of around 2.5 mm.

In the wound-wire-type inductor component 10, the first terminal electrode 41 and the second terminal electrode 42 preferably have a height dimension T4 from the mounting surface to the top edges thereof in a range of around 100 μm to 200 μm. In this embodiment, the height dimension T4 is around 150 μm. As the height dimension T4 of the first terminal electrode 41 and the second terminal electrode 42 increases, the applied amount of mounting solder and the surface area of the applied solder increase when mounting is performed and it is possible to secure mounting strength for the wound-wire-type inductor component 10. Furthermore, as the height dimension T4 of the first terminal electrode 41 and the second terminal electrode 42 decreases, loss of magnetic flux generated by the wire 60 decreases and a high Q value can be secured.

In the wound-wire-type inductor component 10, it is preferable that there be a part where the interval between adjacent turns of the wire 60 is in a range of around 100 μm to 200 μm and it is more preferable that there be a part where the interval is around 150 μm. The larger the interval is, the larger the number of turns that can be wound for a prescribed inductance value. On the other hand, the wound wire part 61 can be formed with a shaft part 21 (core 20) having prescribed dimensions by setting an appropriate upper limited for the interval.

The interval between adjacent turns of the wound wire part 61 may be uniform except for the intervals of the turns at both ends of the wound wire part 61 in the first direction Ld. For example, a winding width L5 of the wound wire part 61 is greater than or equal to 70% of the length dimension of the shaft part 21.

In the wound-wire-type inductor component 10, the diameter of the core wire of the wire 60 is preferably in a range of around 30 μm to 100 μm and more preferably within a range of around 50 μm to 70 μm. As a result of the diameter of the core wire of the wire 60 being larger than a fixed value, an increase in the electrical resistance component is suppressed and a high Q value can be obtained. Furthermore, as a result of the diameter of the core wire of the wire 60 being smaller than a fixed value, the wire 60 can be easily wound around the core 20, that is, processing of the wire 60 can be easily performed.

In the wound-wire-type inductor component 10, the relative permeability μrod of the core 20 is preferably within a range from 50 to 100. As the relative permeability μrod increases, a higher induced voltage V induced can be obtained. On the other hand, the permeability at a radio frequency (10 MHz) can be maintained by setting an appropriate upper limit for the relative permeability μrod.

Examples

Next, the effects realized by the embodiment will be more specifically described by describing examples of the wound-wire-type inductor component 10.

In Table 1, N: number of turns (turns), L5: winding width of wound wire part 61 [mm], inductance value [μH], and communication range [cm] are illustrated for three examples. In the wound-wire-type inductor components 10 of the examples, a core 20 having a prescribed shape and a relative permeability μrod of 50 and a wire 60 having a core wire with a diameter of around 60 μm were used, and the inductance value and communication range were measured for the numbers of turns and winding widths illustrated in Table 1. The communication range is the maximum value of the distance at which an induced voltage of a fixed level or higher is generated in another wound-wire-type inductor component 10 when a prescribed signal is input to one wound-wire-type inductor component 10 among two wound-wire-type inductor components 10.

TABLE 1

| N: Number of Turns (Turns) | L5: Winding Width (mm) | Inductance Value (μH) | Communication Range (cm) |
|---|---|---|---|
| 17 | 1.6 | 3.7 | 21.5 |
| 18 | 1.8 | 4.0 | 22.0 |
| 21 | 4.3 | 3.8 | 23.0 |

As illustrated in Table 1, in wound-wire-type inductor components 10 having identical specifications except for the number of turns and the winding width, it is clear that the number of turns can be increased with respect to a prescribed inductance value (around 3.7 μH) by increasing the winding width, that is, by increasing the interval between adjacent turns of the wound wire part 61 in the first direction Ld. Additionally, it is clear that the communication range increases and a higher induced voltage is obtained when the number of turns is increased.

As described above, according to this embodiment, the following effects are realized.

(1) The wound-wire-type inductor component 10 includes: the core 20 including the substantially column-shaped shaft part 21 that extends in the first direction Ld and the first support part 22 and the second support part 23 that are respectively provided at the first end portion and the second end portion of the shaft part 21 in the first direction Ld; the first terminal electrode 41 and the second terminal electrode 42 that are respectively provided on the first support part 22 and the second support part 23; and the wire 60 including the wound wire part 61 that is wound around the shaft part 21 and the first end 62 and the second end 63 that are respectively connected to the first terminal electrode 41 and the second terminal electrode 42. The interval between adjacent turns of the wound wire part 61 in the first direction Ld is set so that the number of turns wound around the shaft part 21 is high with respect to a prescribed inductance value. As a result, a wound-wire-type inductor component 10 can be provided that is suitable for use as an antenna coil having a prescribed inductance value.

(2) In the wound-wire-type inductor component 10, the interval between adjacent turns of the wound wire part 61 in the first direction Ld is set so that the number of turns wound around the shaft part 21 is high with respect to the prescribed inductance value. Thus, the number of turns of the wound wire part 61 can be increased with respect to the prescribed inductance value and a high induced voltage can be obtained in the wound-wire-type inductor component 10. Therefore, the wound-wire-type inductor component 10 is suitable for use as an antenna coil having a prescribed inductance value.

The above-described embodiment may be implemented in the following ways.

In the above-described embodiment, as illustrated in FIGS. 1 and 3, the interval between adjacent turns of the wound wire part 61 of the wire 60 is constant, but the interval may be changed as appropriate.

Figure 5:
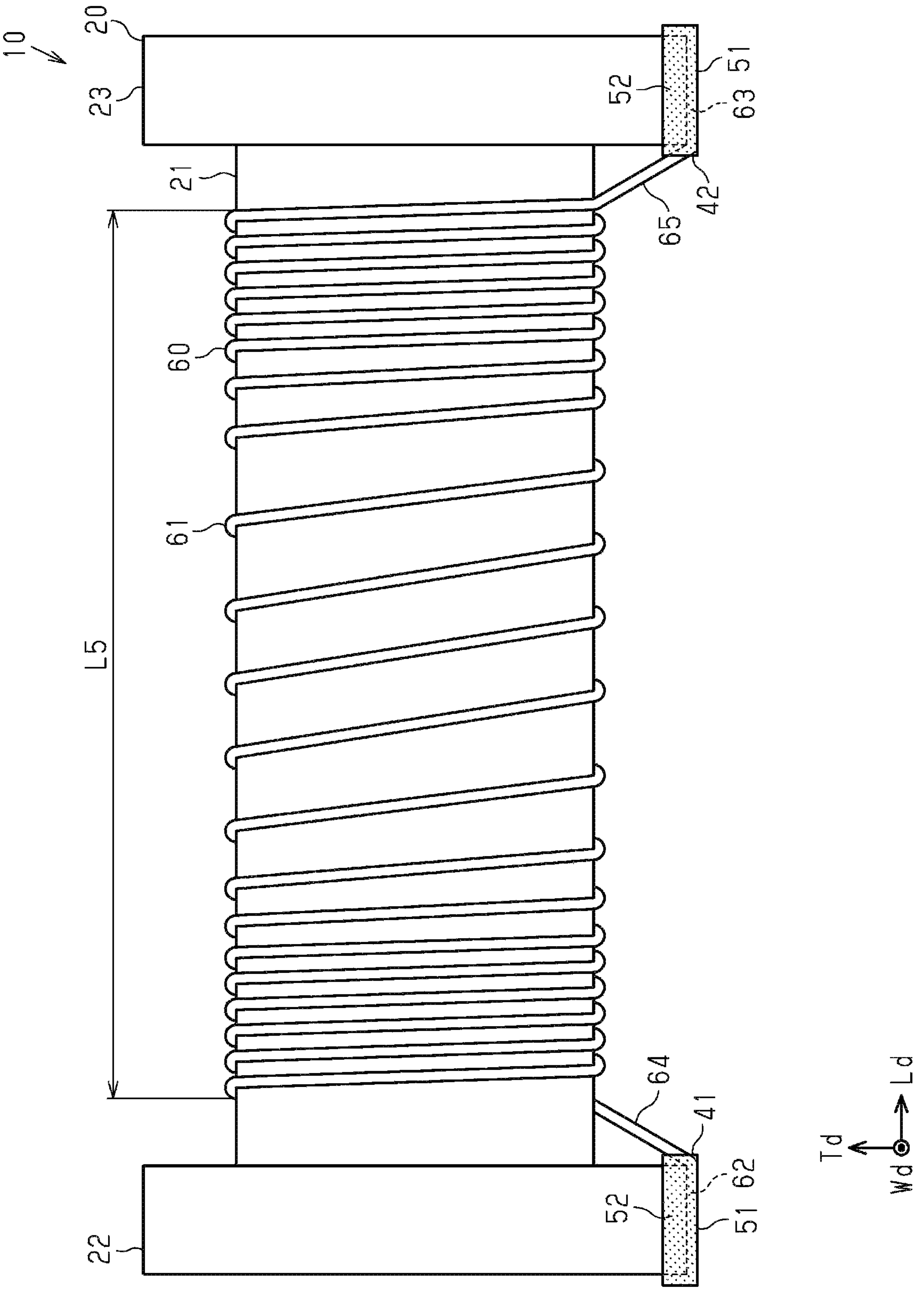
FIG. 5 is a front view of a wound-wire-type inductor component of a modified example.

As illustrated in FIG. 5, the interval between adjacent turns in a central part of the wound wire part 61 may be made larger than the interval between the other turns. The turns having a large interval therebetween are not limited to being located in the central part as illustrated in FIG. 5 and may be changed as appropriate so as to be located close to the first support part 22 and the second support part 23, at a position between the first support part 22 and the second support part 23, and so on. Furthermore, the interval between adjacent turns in the first direction Ld may be made large in a plurality of locations. In other words, the interval between adjacent turns in the first direction Ld in the wound wire part 61 does not have to be constant.

The shape of the core 20 in the above-described embodiment may be changed as appropriate. For example, the shaft part 21 may have the same width as the first support part 22 and the second support part 23. Furthermore, the cross-sectional shape of the shaft part 21 may be a circular shape, an oval shape, a polygonal shape, or the like.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A wound-wire-type inductor component comprising:

a core that includes a column-shaped shaft part that extends in a first direction, and a first support part and a second support part that are respectively provided at a first end portion and a second end portion of the shaft part in the first direction;

a first terminal electrode and a second terminal electrode that are respectively provided on the first support part and the second support part; and a wire that includes a wound wire part that is wound around the shaft part and a first end and a second end that are respectively connected to the first terminal electrode and the second terminal electrode;

wherein an interval between adjacent turns of the wound wire part in the first direction is set so that a number of turns wound around the shaft part is as high as possible with respect to a prescribed inductance value; and an interval between adjacent turns in a central part of the wound wire part is larger than an interval between other turns.

2. The wound-wire-type inductor component according to claim 1, wherein the number of turns is within a range of around 18 to 30, and the wound-wire-type inductor component has an inductance value of around 3.7 μH±10% for an input signal with a frequency of around 10 MHz.

3. The wound-wire-type inductor component according to claim 2, wherein the number of turns is within a range of around 20 to 23, and the wound-wire-type inductor component has an inductance value of around 3.7 μH±5% for an input signal with a frequency of around 10 MHz.

4. The wound-wire-type inductor component according to claim 2, wherein the wound-wire-type inductor component has a Q value in a range of around 26.5 to 100 for an input signal with a frequency of around 10 MHz.

5. The wound-wire-type inductor component according to claim 1, wherein the number of turns is around 21, and the wound-wire-type inductor component has an inductance value of around 3.7 μH±5% for an input signal with a frequency of around 10 MHz.

6. The wound-wire-type inductor component according to claim 1, wherein the wound-wire-type inductor component has a Q value in a range of around 26.5 to 100 for an input signal with a frequency of around 10 MHz.

7. The wound-wire-type inductor component according to claim 6, wherein the wound-wire-type inductor component has a Q value in a range of around 35 to 60 for an input signal with a frequency of around 10 MHz.

8. The wound-wire-type inductor component according to claim 1, wherein the shaft part has a length dimension in a range of around 3 mm to 6 mm, a width dimension in a range of around 1.5 mm to 2.7 mm, and a height dimension in a range of around 1.5 mm to 2.7 mm.

9. The wound-wire-type inductor component according to claim 8, wherein the shaft part has a length dimension of around 5 mm, a width dimension of around 2 mm, and a height dimension of around 2 mm.

10. The wound-wire-type inductor component according to claim 1, wherein the core has a length dimension in a range of around 4 mm to 7 mm, a width dimension in a range of around 2.0 mm to 3.2 mm, and a height dimension in a range of around 2.0 mm to 3.2 mm.

11. The wound-wire-type inductor component according to claim 10, wherein the core has a length dimension of around 5.5 mm, a width dimension of around 2.5 mm, and a height dimension of around 2.5 mm.

12. The wound-wire-type inductor component according to claim 1, wherein the first terminal electrode and the second terminal electrode have height dimensions from bottom surfaces of the first support part and the second support part to top edges thereof in a range of around 100 μm to 200 μm.

13. The wound-wire-type inductor component according to claim 12, wherein the first terminal electrode and the second terminal electrode have height dimensions from the bottom surfaces of the first support part and the second support part to the top ends thereof of around 150 μm.

14. The wound-wire-type inductor component according to claim 1, wherein there is a part in which an interval between adjacent turns of the wound wire part is within a range of around 100 μm to 200 μm.

15. The wound-wire-type inductor component according to claim 14, wherein there is a part in which an interval between adjacent turns of the wound wire part is around 150 μm.

16. The wound-wire-type inductor component according to claim 14, wherein an interval between adjacent turns of the wound wire part is uniform except for at both ends of the wound wire part.

17. The wound-wire-type inductor component according to claim 14, wherein a winding width of the wound wire part is greater than or equal to 70% of a length dimension of the shaft part.

18. The wound-wire-type inductor component according to claim 1, wherein a diameter of a core wire of the wire is in a range of around 30 μm to 100 μm.

19. The wound-wire-type inductor component according to claim 18, wherein the diameter of the core wire of the wire is within a range of around 50 μm to 70 μm.

20. The wound-wire-type inductor component according to claim 1, wherein the core is composed of a material having a relative permeability within a range of around 50 to 100.

* * * * *